(12) United States Patent
Sorani (10) Patent No.: US 8,851,929 B2
(45) Date of Patent: Oct. 7, 2014

(54) SFP FUNCTIONALITY EXTENDER

(75) Inventor: Yzhak Sorani, Ramat Gan (IL)

(73) Assignee: Rad Data Communications Ltd., Tel Aviv (IL)

(*) Notice: Subject to any disclaimer, the term of this patent is extended or adjusted under 35 U.S.C. 154(b) by 122 days.

(21) Appl. No.: 13/363,392

(22) Filed: Feb. 1, 2012

(65) Prior Publication Data

US 2013/0196549 A1  Aug. 1, 2013

(51) Int. Cl.
*H05K 1/11* (2006.01)

(52) U.S. Cl.
USPC .......................................... 439/638; 361/695

(58) Field of Classification Search
USPC .......... 361/803, 752, 807, 810, 695; 439/638, 439/76.1; 385/88, 92
See application file for complete search history.

(56) References Cited

U.S. PATENT DOCUMENTS

| | | | | |
|---|---|---|---|---|
| 4,480,835 A | * | 11/1984 | Williams | 273/148 B |
| 4,941,841 A | * | 7/1990 | Darden et al. | 361/679.39 |
| 5,203,848 A | * | 4/1993 | Wang | 463/45 |
| 5,519,571 A | * | 5/1996 | Shieh | 361/679.37 |
| 6,104,607 A | * | 8/2000 | Behl | 361/679.49 |
| 6,179,627 B1 | * | 1/2001 | Daly et al. | 439/76.1 |
| 6,241,534 B1 | * | 6/2001 | Neer et al. | 439/76.1 |
| 6,381,662 B1 | * | 4/2002 | Harari et al. | 710/301 |
| 6,473,297 B1 | * | 10/2002 | Behl et al. | 361/679.48 |
| 6,574,112 B2 | * | 6/2003 | Washino et al. | 361/752 |
| 6,810,238 B1 | * | 10/2004 | Deeds et al. | 455/90.1 |
| 7,028,202 B2 | * | 4/2006 | Long et al. | 713/340 |
| 7,044,656 B1 | * | 5/2006 | Hofmeister et al. | 385/89 |
| 7,101,188 B1 | * | 9/2006 | Summers et al. | 439/59 |
| 7,179,096 B2 | * | 2/2007 | Dube et al. | 439/76.1 |
| 7,204,723 B2 | * | 4/2007 | Sun | 439/701 |
| 7,273,399 B2 | * | 9/2007 | LeGrow et al. | 439/620.2 |
| 7,302,186 B2 | * | 11/2007 | Light et al. | 398/137 |
| 7,317,733 B1 | | 1/2008 | Olsson et al. | |
| 7,335,033 B1 | * | 2/2008 | Edwards et al. | 439/76.1 |
| 7,530,818 B1 | * | 5/2009 | Wang | 439/76.1 |
| 7,542,681 B2 | * | 6/2009 | Cornell et al. | 398/139 |
| 7,549,884 B2 | * | 6/2009 | Soubh et al. | 439/289 |
| 7,693,178 B2 | | 4/2010 | Wojtowicz | |
| 7,753,714 B2 | * | 7/2010 | Wu et al. | 439/374 |
| 7,876,989 B2 | * | 1/2011 | Aronson et al. | 385/101 |
| 7,933,518 B2 | | 4/2011 | Li et al. | |

(Continued)

FOREIGN PATENT DOCUMENTS

TW   1339462   3/2011

OTHER PUBLICATIONS

International Telecommunication Union—ITU-T; Y.1731; Series Y: Global Information Infrastructure, Internet Protocol Aspects and Next-Generations Networks; OAM Functions and Mechanism for Ethernet based networks; Feb. 2008.

(Continued)

*Primary Examiner* — Neil Abrams
(74) *Attorney, Agent, or Firm* — A.C. Entis-IP Ltd.

(57) ABSTRACT

Apparatus configured to provide a small form-factor module (SFP) that is plugged into a socket of an SFP cage with a functionality, the apparatus comprising: a connector configured to be inserted into the cage socket; functionality circuitry that is electrically connected to the connector and provides the functionality; and a socket electrically connected to the functionality circuitry configured to receive the connector of a conventional SFP module, and to electrically connect the conventional SFP to the functionality circuitry.

19 Claims, 9 Drawing Sheets

(56) References Cited

U.S. PATENT DOCUMENTS

| | | | |
|---|---|---|---|
| 7,934,959 B2* | 5/2011 | Rephaeli et al. | 439/638 |
| 8,075,199 B2* | 12/2011 | Losio et al. | 385/92 |
| 8,079,852 B2* | 12/2011 | Hood et al. | 439/105 |
| 8,111,999 B2* | 2/2012 | Ekkizogloy et al. | 398/135 |
| 8,162,691 B2* | 4/2012 | Chang | 439/541.5 |
| 8,165,471 B2* | 4/2012 | Theodoras et al. | 398/135 |
| 8,167,505 B2 | 5/2012 | Oki | |
| 8,200,097 B2* | 6/2012 | Cole | 398/153 |
| 8,419,444 B2* | 4/2013 | Kagan et al. | 439/76.1 |
| 8,475,215 B2* | 7/2013 | Kan et al. | 439/638 |
| 8,499,103 B2* | 7/2013 | Carter et al. | 710/11 |
| 8,506,333 B2* | 8/2013 | Wang et al. | 439/626 |
| 8,529,280 B2* | 9/2013 | Lim | 439/345 |
| 8,641,429 B2* | 2/2014 | Fish et al. | 439/76.1 |
| 2003/0183698 A1* | 10/2003 | Wu | 235/492 |
| 2006/0209886 A1 | 9/2006 | Silberman et al. | |
| 2010/0281518 A1 | 11/2010 | Bugenhagen | |
| 2010/0303465 A1* | 12/2010 | Dahlfort | 398/115 |
| 2011/0206328 A1 | 8/2011 | Wang | |
| 2011/0250791 A1 | 10/2011 | Straka et al. | |
| 2013/0237092 A1* | 9/2013 | Rubens | 439/607.23 |

OTHER PUBLICATIONS

IEEE Standard for Information Technology—Telecommunications and information exchange between systems—Local and metropolitan area networks—Specific Requirements; Part 3: Carrier Sense Multiple Access with Collision Detection (CSMA/CD) access method and Physical Layer specifications; Section Five; Clause 57.

S. Shalunov et al; A One-way Active Measurement Protocol (OWAMP), Network Working Group, Internet2, Sep. 2006.

K. Hedayat et al; A Two-Way Active Measurement Protocol (TWAMP), Network Working Group, Nortel Networks, Oct. 2008.

Metro Ethernet Forum Technical Specification; MEF 10.2; Ethernet Services Attributes Phase 2; Oct. 27, 2009.

International Search Report mailed Jun. 19, 2013 for corresponding PCT application PCT/IB2013/050813; international filing date Jan. 31, 2013.

\* cited by examiner

SFP FUNCTIONALITY EXTENDER

TECHNICAL FIELD

Embodiments of the invention relate to pluggable communication modules such as small form-factor pluggable modules (SFPs) and "cages" that receive such modules and connect them to communication devices.

BACKGROUND

With the expansion of communication networks to connect ever more people to each other and to sources of entertainment and information, and to support autonomous communication between devices that support modern technology and culture, the networks have provided an enormous increase in communication connectivity and bandwidth. The physical infrastructures that support the networks have become increasingly more complex and have developed to enable an increasing variety of communication functionalities.

To provide for a greater variety of functionalities, optical fiber interfaces have, by practical necessity, been configured in small modules that are easily mounted onto communications equipment. By using such modules, communications equipment can be easily adapted to a large variety of optical fiber physical layers, such as single-mode or multi-mode fiber; short-range (less than 1 km), long range (10 km), or extended-range (80 km) coverage; different wavelengths of light such as 850, 1310, 1490, or 1550 nm (nanometer); and single wavelength, Coarse Wavelength Division Multiplexing (CWDM), or Dense Wavelength Division Multiplexing (DWDM). Without such modules communications equipment vendors would need to manufacture a wide variety of equipment, identical in communications functionality but differing in fiber optical interface characteristics.

Modern versions of these communications modules are pluggable, i.e. they may easily be inserted into and removed from matching receptacles, referred to as "cages" mounted on panels of communications equipment, such as switches and routers. The cages serve to mechanically and electronically connect the communication modules inserted into the cages to the communications equipment.

Standards for small communication modules, such as Small Form-factor Pluggable (SFP) modules, Enhanced Small Form-factor Pluggable (SFP+) modules, 10G Form-factor Pluggable (XFP) modules, 100G Form-factor Pluggable (CFP) modules, and Gigabit Interface Converter (GBIC) modules, have been specified by industry groups in agreements known as "multisource agreements (MSA)". Multisource agreements specify electrical, optical, and physical features of the modules. Hereinafter the acronym "SFP" may be used generically to reference small communication modules, such as any of the exemplary small communication modules noted above.

Conventional small communications modules such as SFPs are limited in functionality to performing electric to optical and optical to electric conversions. Recently, additional functionalities have been implemented inside such modules, effectively turning these modules into sophisticated network elements in their own right. For example, U.S. Pat. No. 7,317,733 to Olsson and Salemi describes performing Ethernet to TDM protocol conversion inside an SFP. US patent application 2006/0209886 to Silberman and Stein further describes pseudowire encapsulation inside an SFP. U.S. Pat. No. 7,933,518 to Li et al describes performing optical loopback and dying gasp inside an SFP. U.S. Pat. No. 7,693,178 to Wojtowicz describes inserting Passive Optical Network ONU functionality into an SFP. SFPs and similar pluggable modules with such additional functionalities save rack space, power, and cabling, but suffer from the same deficiency as communications equipment before the introduction of SFPs, namely that vendors need to manufacture a wide variety of SFPs identical in communications functionality while differing only in fiber optical interface characteristics.

SUMMARY

An embodiment of the invention relates to providing a component, hereinafter referred to as a functionality extender or EXTENDER, that may be inserted into an SFP cage, and into which a conventional SFP module may subsequently be inserted. The conventional SFP module is connected via the EXTENDER to the SFP cage and thus able to provide standard optical interface functionality. In addition the EXTENDER comprises circuitry and/or devices, hereinafter also referred to as "functionality circuitry", that provides the SFP module with an additional functionality and/or service, hereinafter generically referred to as a functionality.

In accordance with an embodiment of the invention, the functionality circuitry provides a processing functionality, such as by way of example, packet inspection, statistics collection, packet header editing (for example, pushing an Ethernet VLAN tag); packet insertion and removal (for example, of Ethernet OAM packets); generation of control/management information (for example, sending a dying gasp alarm), and/or a physical functionality (for example, a mini-fan to cool the SFP module).

In an embodiment of the invention, a daisy chain of EXTENDERs may be plugged into an SFP cage and an SFP module may be plugged into the daisy chain to connect the SFP module via the daisy chain to the SFP cage.

There is therefore provided in accordance with an embodiment of the invention, apparatus configured to provide a functionality to a small form-factor module (SFP) that is plugged into a cage socket of an SFP cage, the apparatus comprising: a connector configured to be inserted into the cage socket; functionality circuitry that is electrically connected to the connector and provides the functionality; and a socket electrically connected to the functionality circuitry configured to receive a connector of a conventional SFP module, and to electrically connect the conventional SFP to the functionality circuitry. Optionally, the functionality circuitry comprises electric circuitry, and/or a Field Programmable Gate Array (FPGA), and/or an Application Specific Integrated Circuit, and/or a Central processing Unit (CPU).

In an embodiment of the invention, the functionality circuitry is configured to generate dying-gasp messages. Optionally, the functionality circuitry comprises a mini-fan to cool the SFP. Optionally, the functionality comprises functionality of an Ethernet Network Interface Device (NID) or Ethernet Network Termination Unit (NTU).

In an embodiment of the invention, the functionality circuitry is configured to provide packet inspection, statistics collection, packet header editing, packet insertion and removal, and/or traffic conditioning. Optionally, packet inspection detects anomalous or potentially malicious packets, or classifies packets and collects statistics regarding applications in use, or monitors and optionally controls traffic flows. Additionally or alternatively, packet header editing is employed for packet marking, manipulation of Ethernet VLAN tags, manipulation of MPLS label stacks, or protocol conversion. Additionally or alternatively, packet insertion and deletion performs Fault Management or Operations Administration and Maintenance (OAM). Optionally, the functionality circuitry is configured to pass most packets transparently from a conventional SFP to a cage socket, but distinguish OAM or performance measurement packets. Optionally, the functionality circuitry is configured to act as a reflector or responder. Optionally, traffic conditioning shapes traffic to comply with Ethernet bandwidth profiles defined in Metro Ethernet Forum Technical Specification MEF-10.2.

In an embodiment of the invention, the functionality circuitry is comprised in a PCB. Optionally the PCB comprises the connector configured to be inserted into the cage socket. Optionally the PCB comprises a connector plugged into the socket that electrically connects the functionality circuitry to the socket. Optionally the apparatus comprises a cowling that houses a region of the PCB comprising the connector configured to be inserted into the cage socket. Optionally the cowling is formed having slots into which the PCB seats. Optionally the PCB is held in place between and by the socket and the cowling.

In an embodiment of the invention, the apparatus is configured to be connected mechanically and electrically to another apparatus according to claim 1 by plugging the connector of the apparatus into the socket of the other apparatus.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical structures, elements or parts that appear in more than one figure are generally labeled with a same numeral in all the figures in which they appear. Dimensions of components and features shown in the figures are chosen for convenience and clarity of presentation and are not necessarily shown to scale.

DETAILED DESCRIPTION

In the following detailed description, conventional SFPs and SFP cages are discussed with reference to FIGS. 1A-1C. Discussion of EXTENDERs in accordance with embodiments of the invention and details of their construction and assembly are discussed with reference to FIGS. 2A and 2B. FIGS. 3A and 3B illustrate use of EXTENDERs in SFP cages. Various functionalities that may be provided by EXTENDERs in accordance with embodiments of the invention are discussed with reference to FIGS. 4A-4D. Daisy chaining EXTENDERs in accordance with an embodiment of the invention is discussed with reference to FIG. 5

Figure 1A:
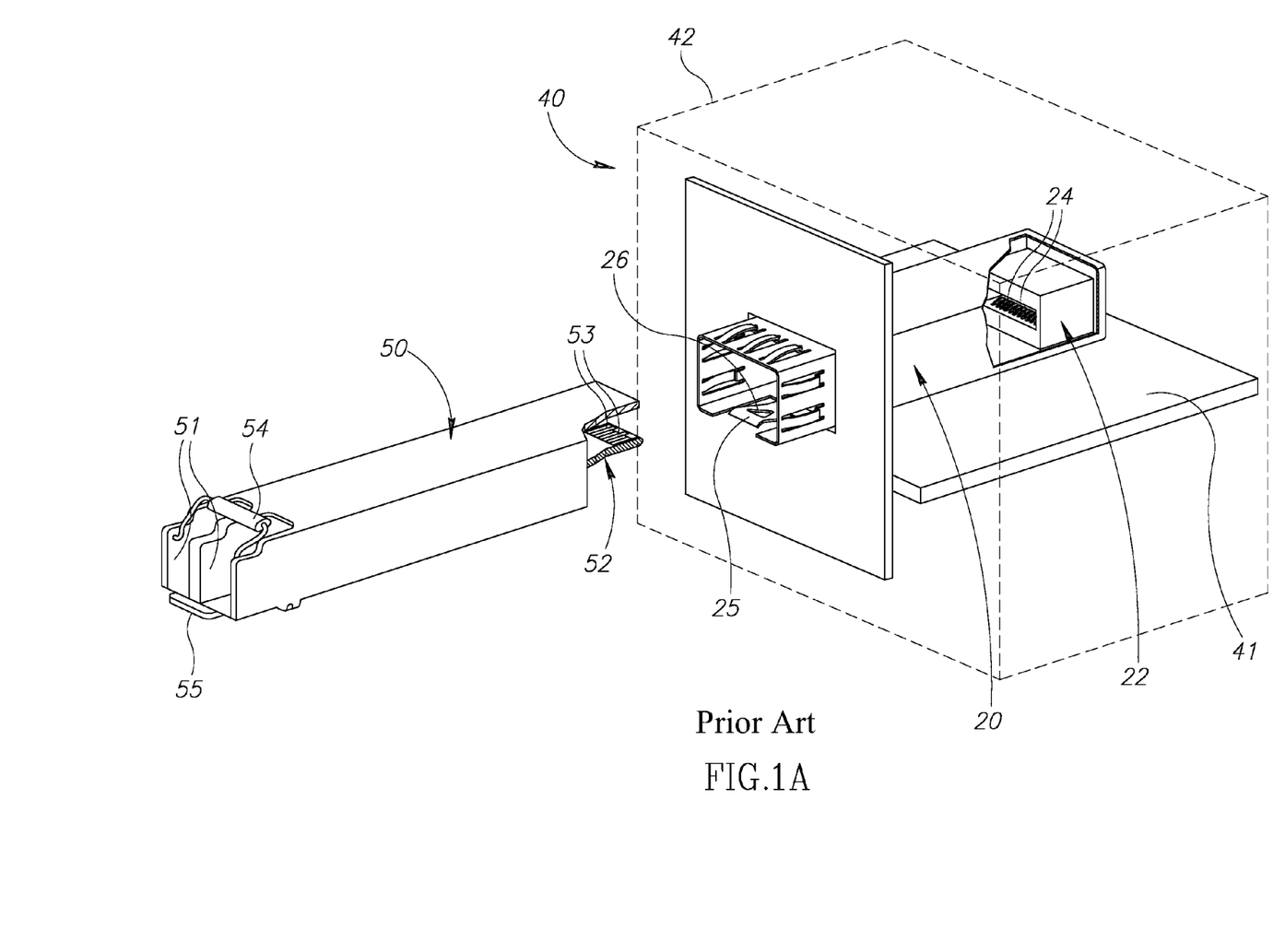
FIG. 1A schematically shows a conventional SFP cage and an SFP module that may be plugged into the cage.
Figure 1B:
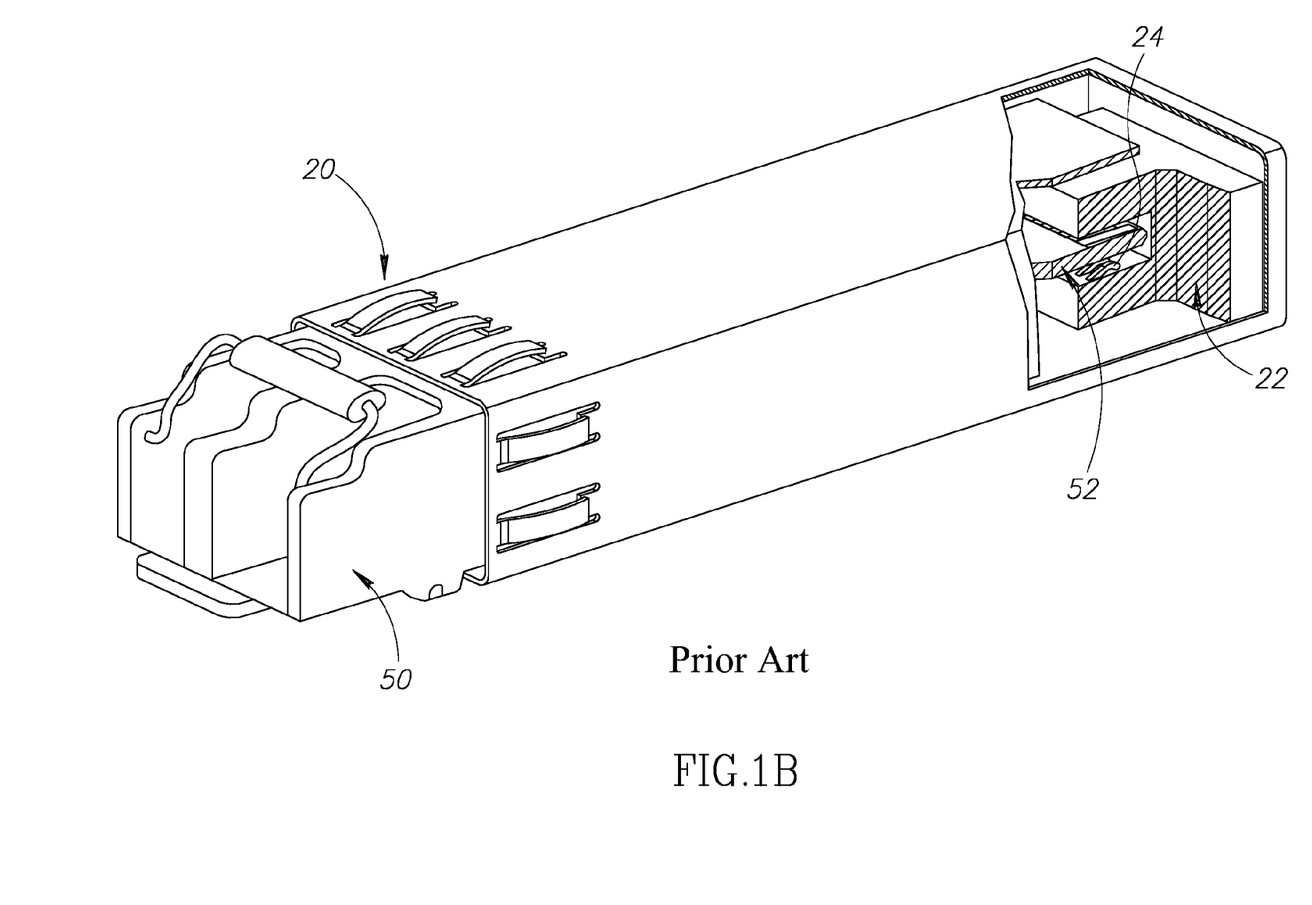
FIG. 1B schematically shows the conventional SFP cage shown in FIG. 1A with the SFP module plugged into the cage.
Figure 1C:
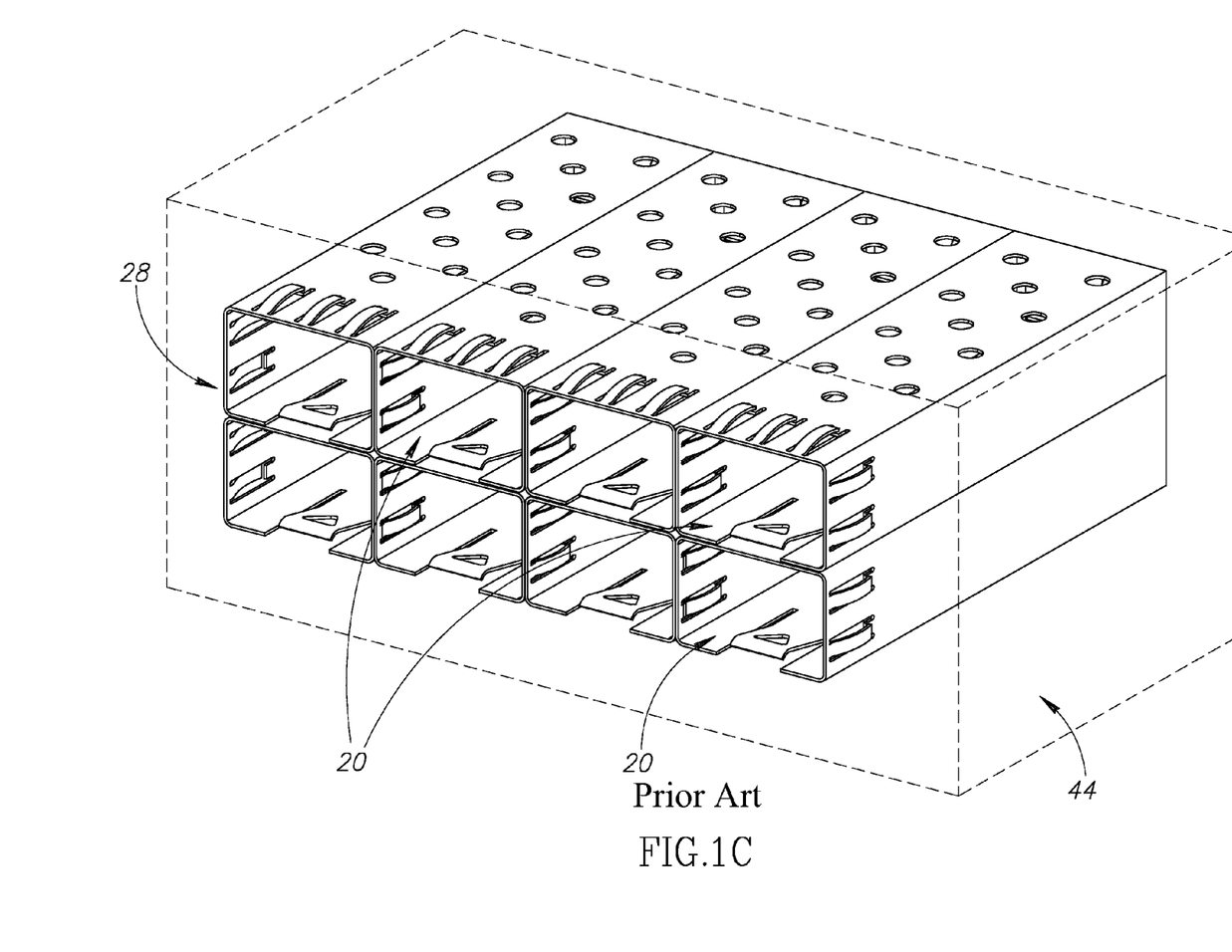
FIG. 1C schematically shows an array of conventional SFP cages for receiving SFP modules.

FIG. 1A schematically shows a conventional SFP cage 20 mounted on PCB 41 of a communications device 40 and accessible via a panel schematically represented by dashed lines 42. The figure also shows an SFP module 50 that may be inserted into cage 20 to connect the SFP module to circuitry in host PCB 41. The SFP cage and SFP module are partially cutaway to show details of their features discussed below. By way of example, SFP module 50 is assumed to be an optical transceiver configured having two connectors 51 for receiving and mating with optical fiber connectors of optical fibers over which optical signals are received and transmitted by the transceiver.

SFP transceiver 50 comprises an edge connector 52, which has conductive contacts 53 that are electrically connected to circuitry (not shown) in the SFP module. Whereas conductive contacts 53 are shown only on the upper side of the connector, they may be on the upper and/or the lower of the connector. SFP cage 20 comprises a cage socket 22 having conducting contacts 24 that match conducting contacts 53 and are electrically connected to conductive traces (not shown) in host PCB 41 that connect the conducting contacts of the socket to circuitry (not shown) in communications device 40. The socket is configured to receive connector 52 and connect conductive contacts 53 of the connector to matching conductive contacts 24 in cage socket 22, and thereby to electrically connect the transceiver to circuitry in communication device 40.

Cage 20 optionally has a spring latch 25 formed having a hole 26 that receives and engages a matching "button" (not shown) in SFP transceiver 50 to lock the SFP transceiver in the cage when it is fully inserted into the cage. A release lever 54 is pulled downward to push a slider 55 (only a portion of which is shown in FIG. 1A) in the SFP so that it contacts and depresses spring latch 25 to disengage the spring latch from the locking button. With the locking button disengaged, the SFP may be extracted from SFP cage 20. FIG. 1B schematically shows SFP transceiver 50 fully inserted into cage 20 and connector 52 plugged into cage socket 22.

Generally, a communication device is configured to receive and process signals from a plurality of different SFP modules and comprises a bank of SFP cages. FIG. 1C schematically shows a communication device 44 comprising a bank 28 of SFP cages 20. Often it is desired to provide given SFP modules plugged into cages in a communication device such as communication devices 40 and 44 with additional functionalities that are not provided by the communication device. Typically, this requires adding additional communication devices, providing them with rack-space and electrical power, connecting the additional devices to existing devices with optical fibers and/or electrical wires, and configuring/managing the additional devices via a network management system.

Figures 2A, 2B:
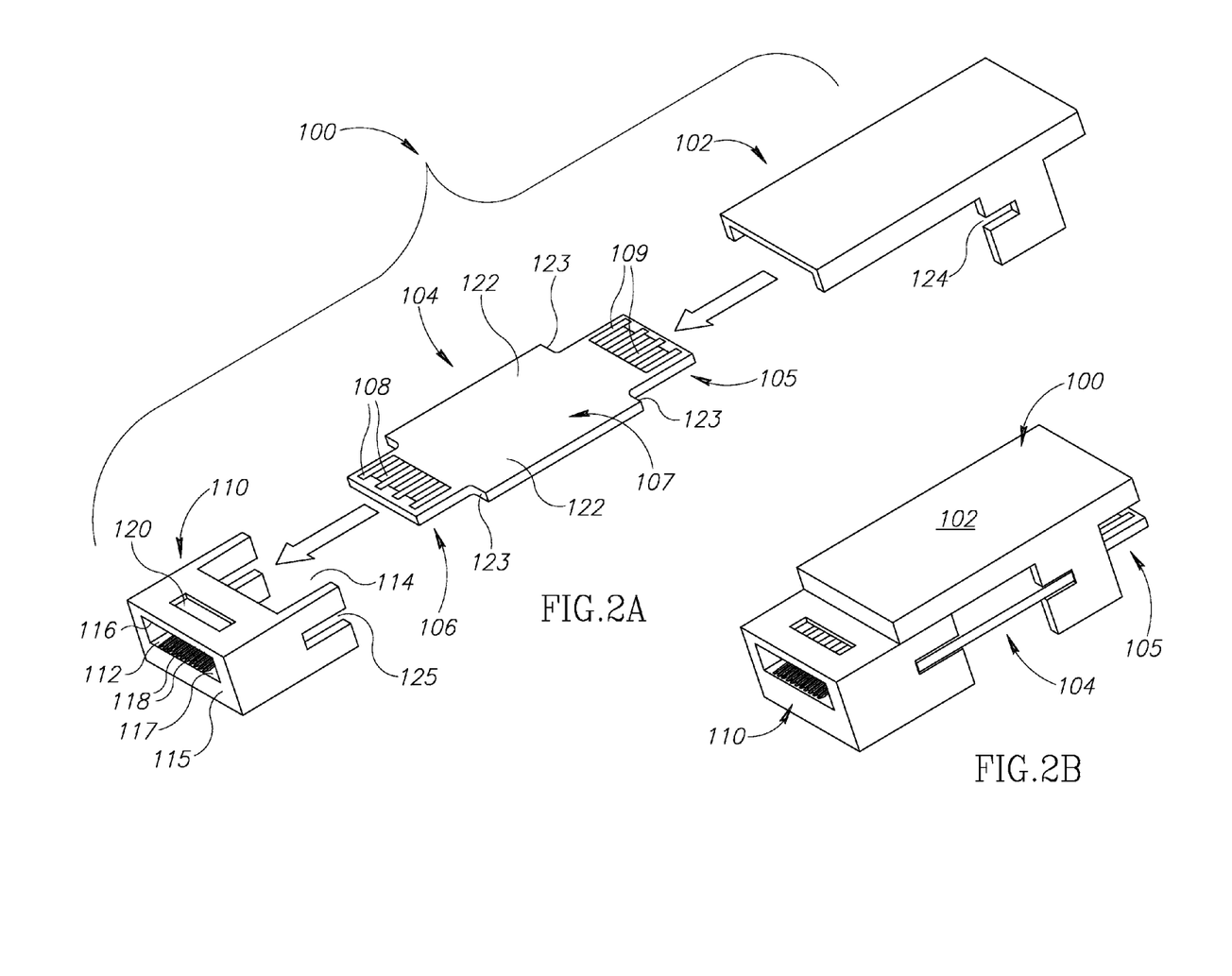
FIG. 2A schematically shows an exploded view of an EXTENDER, with functionality circuitry comprising a Printed Circuit Board (PCB), in accordance with an embodiment of the invention.
FIG. 2B schematically shows the EXTENDER shown in FIG. 2A assembled, in accordance with an embodiment of the invention.
Figure 3A:
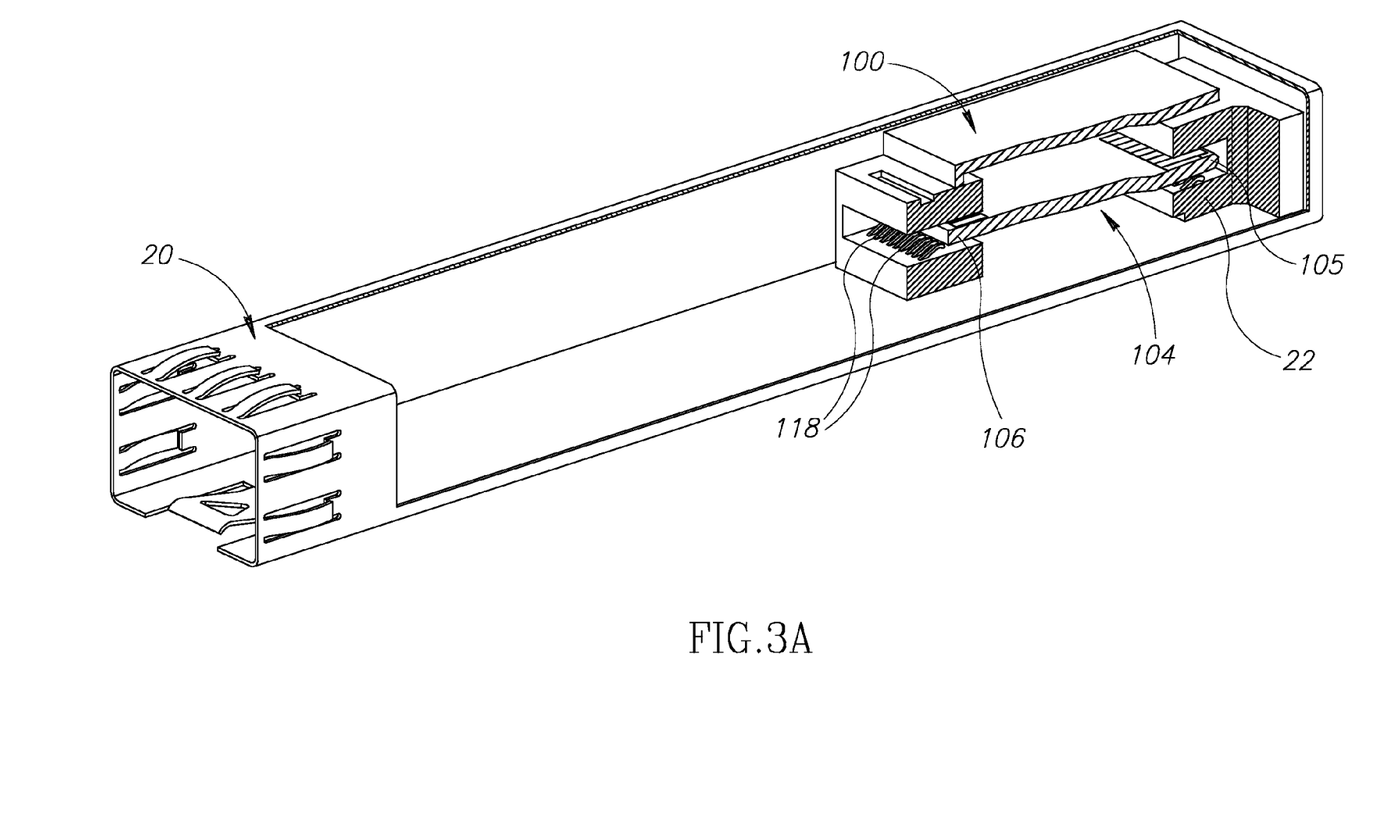
FIG. 3A schematically shows a perspective cutaway view of the EXTENDER shown in FIG. 2B plugged into a conventional cage, in accordance with an embodiment of the invention.
Figure 3B:
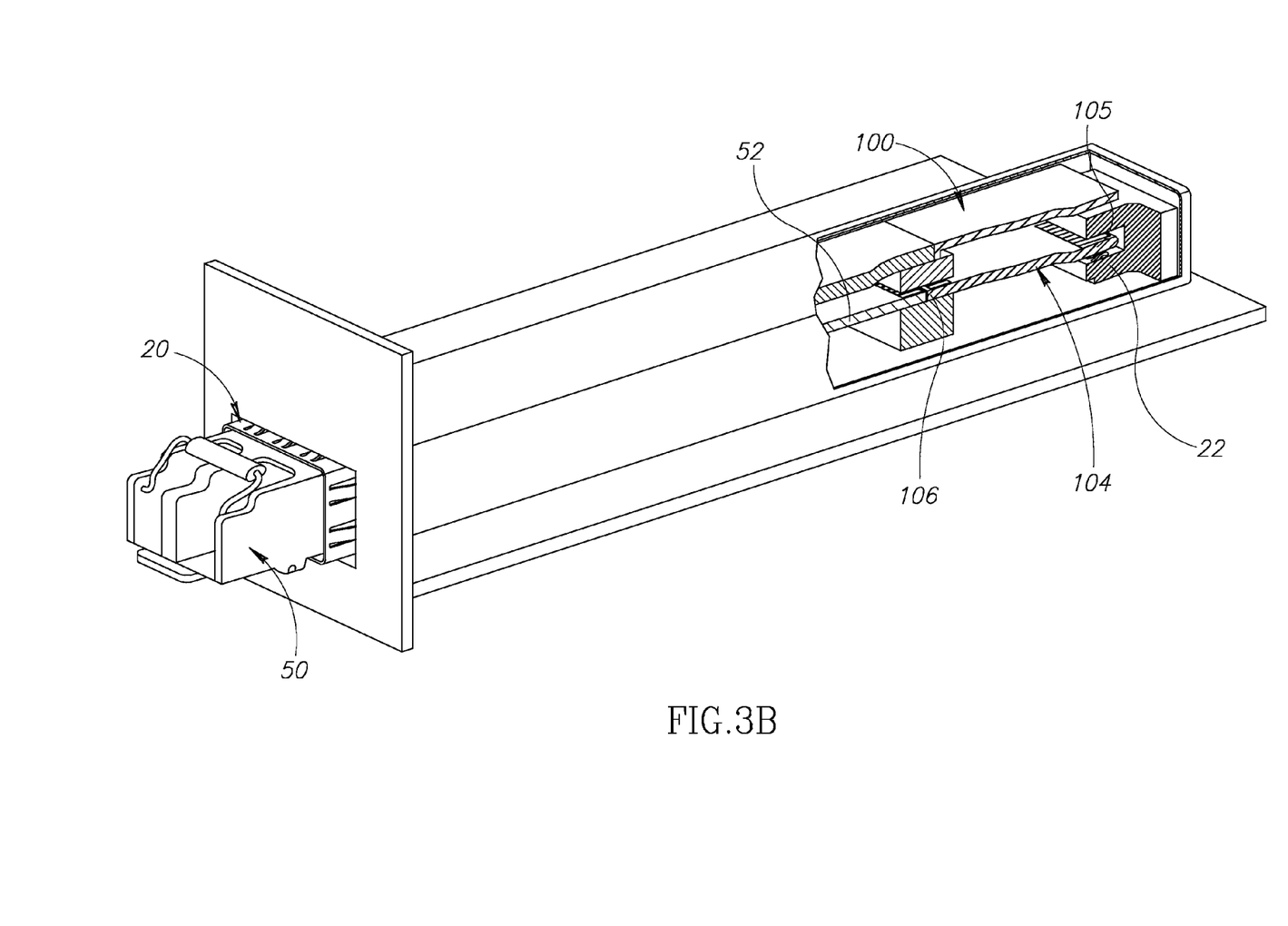
FIG. 3B schematically shows a perspective cutaway view of an SFP module plugged into the EXTENDER and thereby the cage shown in FIG. 3A, in accordance with an embodiment of the invention.

FIG. 2A schematically shows an exploded view of an EXTENDER 100 that may be plugged into a conventional SFP cage to provide an additional functionality. The use of an EXTENDER in accordance with an embodiment of the invention may enable provision of additional functionalities for an SFP comprised in a communication network, such as by way of example SFP transceiver 50 shown in FIG. 1A, without a need to provide rack-space, mechanical support, electric power, and connections to the network and management system.

EXTENDER 100 comprises an "EXTENDER connector" 105, a "functionality PCB" 104, and an "EXTENDER socket" 110. EXTENDER connector 105 may be physically identical to the connector 52 of a conventional SFP, and EXTENDER socket 110 is configured to receive a connector 52 that fits into a socket 22 of a conventional SFP cage. Optionally, EXTENDER 100 comprises a cowling 102, and a release mechanism. Optionally, EXTENDER socket 110 is formed having an extraction recess 120 that may be used, as discussed below to extract EXTENDER from an SF cage into which the EXTENDER is plugged.

Functionality PCB 104 comprises a region 107, hereinafter a functionality region 107, which may comprise any of various functionality circuitries for providing an SFP with an additional functionality. Exemplary functionalities and functionality circuitries that may be provided by an EXTENDER similar to EXTENDER 100 in accordance with embodiments of the invention are discussed below. EXTENDERs comprising functionality PCBs having functionality regions 107 that include functionality circuitry configured to provide any of various functionalities in accordance with an embodiment of the invention are generically referred to as EXTENDERs 100.

Optionally functionality PCB may be configured with first and second PCB connectors 105 and 106, hereinafter referred to respectively as EXTENDER connectors 105 and 106, that straddle region 107. EXTENDER connector 105 is configured to mate with a conventional SFP cage socket. EXTENDER connector 106 is configured to mate with EXTENDER socket 110, which electrically connects its conductive contacts 108 with electrical contacts 118 comprised in the EXTENDER socket.

As aforementioned, EXTENDER connector 105 of functionality PCB 104 is configured for insertion into a socket of a conventional SFP cage, such as socket 22 shown in FIG. 1A. The EXTENDER connector has conductive contacts 109 that match conductive contacts 24 in cage socket 22 (FIG. 1A) and make electrical contact with the conductive contacts in the socket when the EXTENDER connector is inserted into the socket. EXTENDER socket 110 has conductive contacts 118 for electrically connecting a conventional SFP module to functionality circuitry in functionality region 107 of the EXTENDER, and via the functionality circuitry and/or conductive traces in the functionality region, to conductive contacts 24 in cage socket 22 and thereby to circuitry in host PCB 41 (FIG. 1A). It is noted that whereas conductive contacts are shown on (visible) upper sides of EXTENDER connectors in FIG. 2A and figures that follow, conductive contacts may be on the upper and/or the (not visible) lower sides of the connectors.

EXTENDER socket 110 is formed having a cavity 112 dimensioned to receive EXTENDER connector 106 from a first side 114 of the coupling socket and a connector 52 (FIG. 1A) of an SFP module from a second, opposite side 115 of the coupling socket. At least one of upper and lower walls 116 and 117 respectively of cavity 112 have conductive contacts 118 that are electrically connected to conductive contacts 108 in EXTENDER connector 106 when the EXTENDER connector is inserted into cavity 112. When a connector, such as connector 52 of SFP 50 (FIG. 1A) is inserted into cavity 112 from side 115 of coupling socket 110, conductive contacts in connector 52 make electrical contact with the conductive contacts 118 in the coupling socket and thereby with functionality PCB 104 and a cage socket 22 into which the EXTENDER is plugged. Optionally, coupling socket 110 is formed having an extraction recess 120 that may be used, as discussed below to extract EXTENDER from a cage into which the EXTENDER is plugged.

Optionally, cowling 102 and EXTENDER socket 110 are configured to secure functionality PCB 104 between them. Optionally, functionality PCB 104 is formed having protruding sidebars 122 that provide the functionality PCB with shoulders 123. Optionally, cowling 102 and EXTENDER socket 110 are formed having slots 124 and 125 respectively for receiving protruding sidebars 122. EXTENDER 100 is assembled by inserting sidebars 122 of functionality PCB into slots 124 and 125 so that shoulders 123 butt up against bottoms of the slots and bonding the inserted functionality PCB to the cowling and EXTENDER socket. Any of various methods and technologies, such as by way of example, ultrasound welding or epoxy bonding, may be used to bond the functionality PCB to the cowling and coupling socket. FIG. 2B schematically shows an assembled view of EXTENDER 100.

EXTENDER 100 is readily inserted into an SFP cage, such as SFP cage 20 (FIG. 1A) so that EXTENDER connector 105 is plugged into cage socket 22, optionally by pushing the EXTENDER with a suitable push tool or rod (not shown). FIG. 3A schematically shows a partially cutaway image of EXTENDER 100 inserted and plugged into cage 20. EXTENDER 100 may optionally be extracted from cage 20 by inserting an extraction tool having a tooth that fits into extraction recess 120 into SFP cage 20 so that the tooth catches in the extraction recess. After catching in the extraction recess, the extraction tool may be drawn out of cage 20 together with EXTENDER 100. In an embodiment of the invention, a same dual purpose tool may function as both a push tool for inserting EXTENDER 100 into cage 20 and an extraction tool for removing the EXTENDER. FIG. 3B schematically shows a cutaway image of SFP 50 inserted into cage 20 and plugged into EXTENDER 100 shown in FIG. 3A.

In an embodiment of the invention, functionality region 107 contains electric circuitry and/or a Field Programmable Gate Array (FPGA) and/or an Application Specific Integrated Circuit and/or a Central Processing Unit (CPU), in order to provide additional communication functionality. Such functionality may include packet inspection, statistics collection, packet header editing, packet insertion and removal, and traffic conditioning.

Packet inspection, including Deep Packet Inspection, may be employed in order to detect anomalous or potentially malicious packets, or to classify packets and collect statistics regarding applications in use, or to monitor and optionally police/shape traffic flows.

Packet header editing may be used for packet marking (e.g., drop eligibility marking), manipulation of Ethernet VLAN tags (insertion of a tag, deletion of a tag, swapping a tag value), manipulation of MPLS label stacks (pushing a label(s), swapping a label, popping a label), or protocol conversion (Rate Interface Conversion, TDM to packet conversion, pseudowire encapsulation, etc.).

Packet insertion and deletion may be used for Operations, Administration, and Maintenance functionality (e.g., Ethernet OAM according to ITU-T Recommendation Y.1731 and or IEEE 802.3 Clause 57, IP performance measurement via One-Way or Two-Way Active Measurement Protocol (OWAMP/TWAMP), and for terminating control or management protocols. In an embodiment the functionality region is configured to pass most packets transparently from the conventional SFP to the cage socket, but to be responsive to specific OAM or performance measurement packets. In an embodiment the functionality region may be configured as a reflector or responder that reflects packets with specific characteristics back to their source, or selective responds to packets with specific characteristics.

Traffic conditioning may be used to match traffic parameters to configured levels, such as Ethernet bandwidth profiles as defined in Metro Ethernet Forum Technical Specification MEF-10.2.

In an embodiment of the invention, packet inspection, header editing, and OAM functionalities are combined with traffic conditioning to implement an Ethernet Network Interface Device (NID) or Ethernet Network Termination Unit (NTU).

Figures 4A, 4B, 4C:
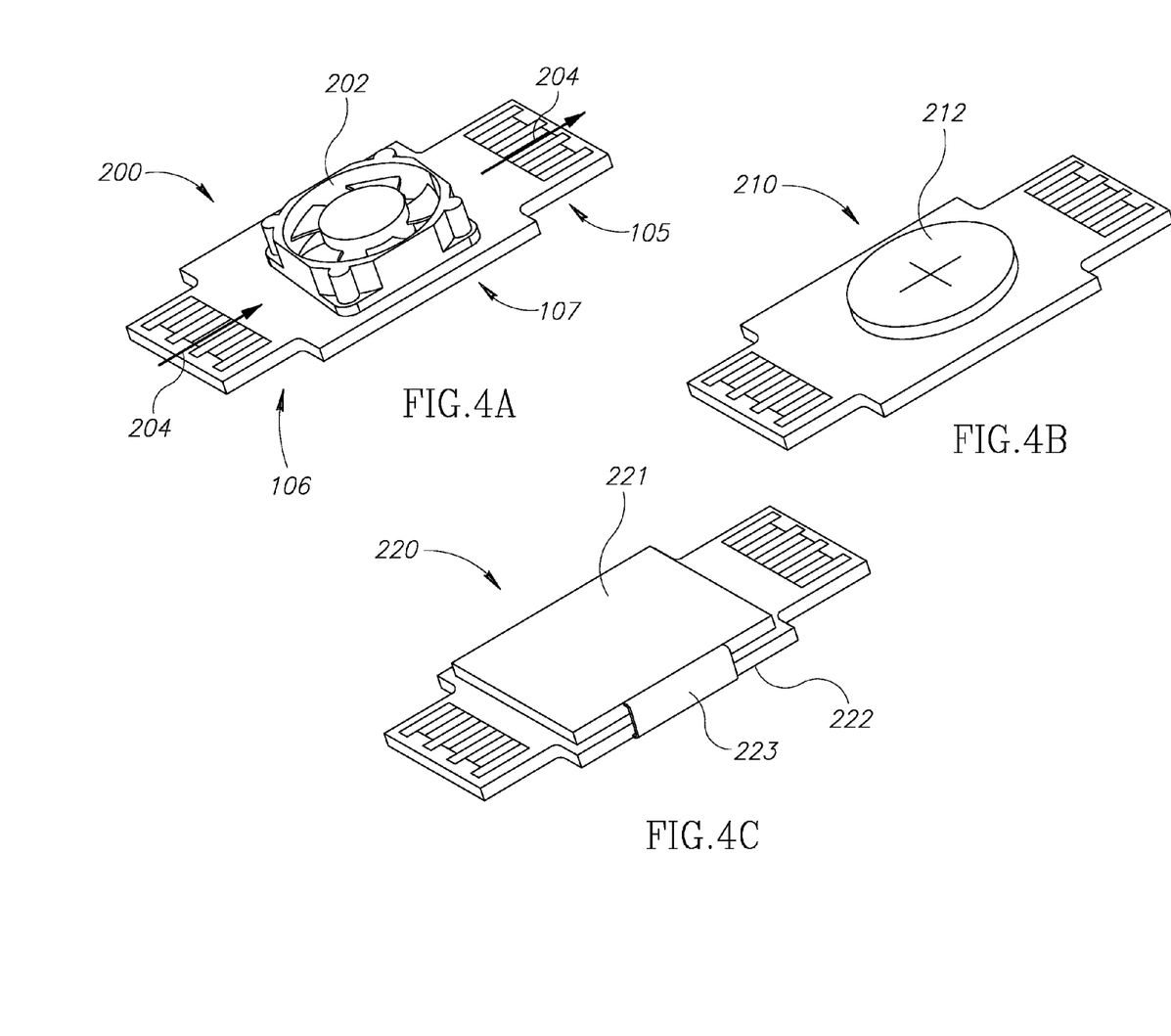
FIG. 4A schematically shows an EXTENDER PCB comprising a mini-fan, in accordance with an embodiment of the invention.
FIG. 4B schematically shows an EXTENDER PCB comprising a button battery, in accordance with an embodiment of the invention.
FIG. 4C schematically shows an EXTENDER PCB having increased area for functionality circuitry, in accordance with an embodiment of the invention.

FIG. 4A schematically shows a functionality PCB 200, having EXTENDER connectors 105 and 106 and a functionality region 107, for incorporation in EXTENDER 100, in accordance with an embodiment of the invention. Functionality PCB 200 comprises a mini-fan 202 mounted in functionality region 107 for improving ventilation in an SFP cage into which it is plugged and thereby improving heat dissipation for an SFP inserted into the cage. Functionality region 107 of functionality PCB 104 may comprise functionality circuitry (not shown) that measures temperature in the cage and controls mini-fan 202 responsive to the measured temperature. For example, below a given predetermined threshold temperature the functionality circuitry may maintain mini-fan 202 turned off. Above the threshold temperature, the functionality circuitry turns on the min-fan to generate airflow in directions indicated by arrows 204. Optionally, the functionality circuitry is located on a side of functionality PCB 200 opposite to that on which mini-fan 202 is located.

FIG. 4B schematically shows a functionality PCB 210 comprising a rechargeable "button" battery 212 that may be included in EXTENDER 100 in accordance with an embodiment of the invention. In an embodiment of the invention, functionality PCB 104 includes functionality circuitry (not shown) that provides power to a conventional SFP module plugged into the EXTENDER when the SFP loses power. The functionality circuitry is optionally located on a side of the functionality PCB opposite to the side on which button battery 210 is located. In an embodiment of the invention, the functionality circuitry is configured to instruct the SFP module to transmit a "dying gasp" message to inform a network management system of the loss of power.

In some embodiments of the invention, functionality circuitry to be included in a functionality PCB is not conveniently included in a functionality PCB having a size and construction shown in FIGS. 1A, 4A, and 4B. FIG. 4C schematically shows a functionality PCB 220 for inclusion in EXTENDER 100 that has increased area for functionality circuitry. Functionality PCB 220 comprises upper and lower sub-PCBs 221 and 222 respectively. The portions are electrically and physically connected by a flexible neck 223 comprising conductive traces (not shown) configured to connect functionality circuitry components (not shown) located on bottom portion 222 with functionality circuitry components (not shown) located on top portion 221. In an embodiment of the invention functionality PCB 220 is formed by slotting a PCB to form the two PCB portions connected by the neck region. The neck region is thinned, for example by etching or abrading, to make it sufficiently flexible so that it can be bent to position the PCB portions one over the other, as shown in FIG. 4C.

Figure 4D:
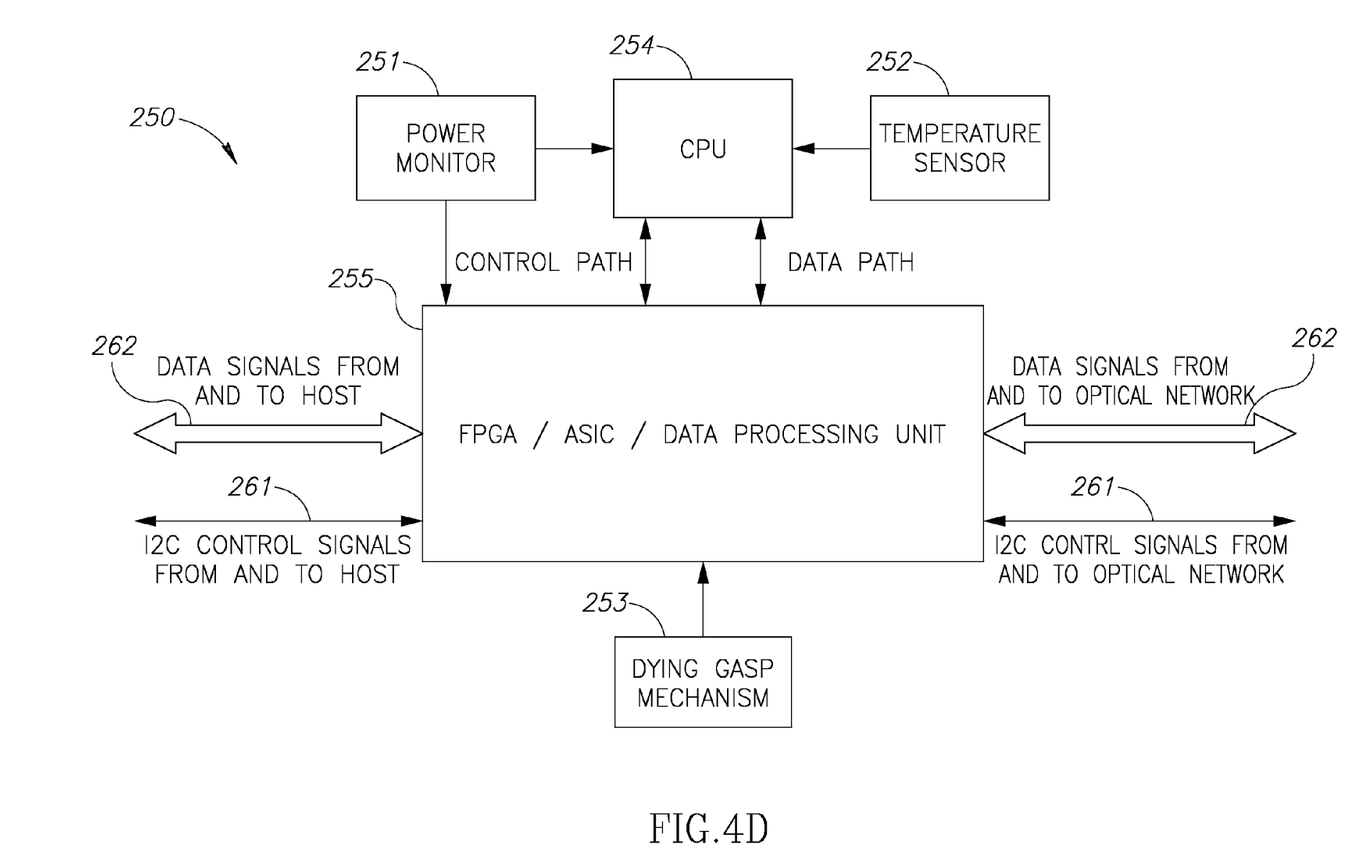
FIG. 4D schematically shows a schematic of functionality circuitry included in an EXTENDER PCB, in accordance with an embodiment of the invention.

By way of example, functionality PCB 220 may have functionality circuitry similar to functionality circuitry 250 schematically shown in FIG. 4D. Functionality circuitry 250 optionally comprises a CPU 254, a communications processing unit 255, a power monitor 251, a temperature sensor 252 and a dying gasp mechanism 253. Voltage monitor 251 monitors voltage provided to EXTENDER 100 and an SFP module, such as SFP module 50 (FIG. 3B), plugged into the EXTENDER. If the voltage supply to the EXTENDER and its SFP module 50 drops below a desired operating voltage, the voltage monitor informs data processing unit 255 and CPU 254. Optionally, CPU 254 generates a dying gasp message to inform the network management system of the loss of voltage. When voltage to EXTENDER 100 returns to a level sufficient for proper operation, voltage monitor 251 awakens CPU 254 and processing unit 255. Temperature sensor 252 acquires readings of ambient temperature and transmits the readings to CPU 254. The CPU uses the readings to report status of the EXTENDER 100 transceiver to a network management system (not shown) and optionally to turn on a mini-fan (not shown).

Figure 5:
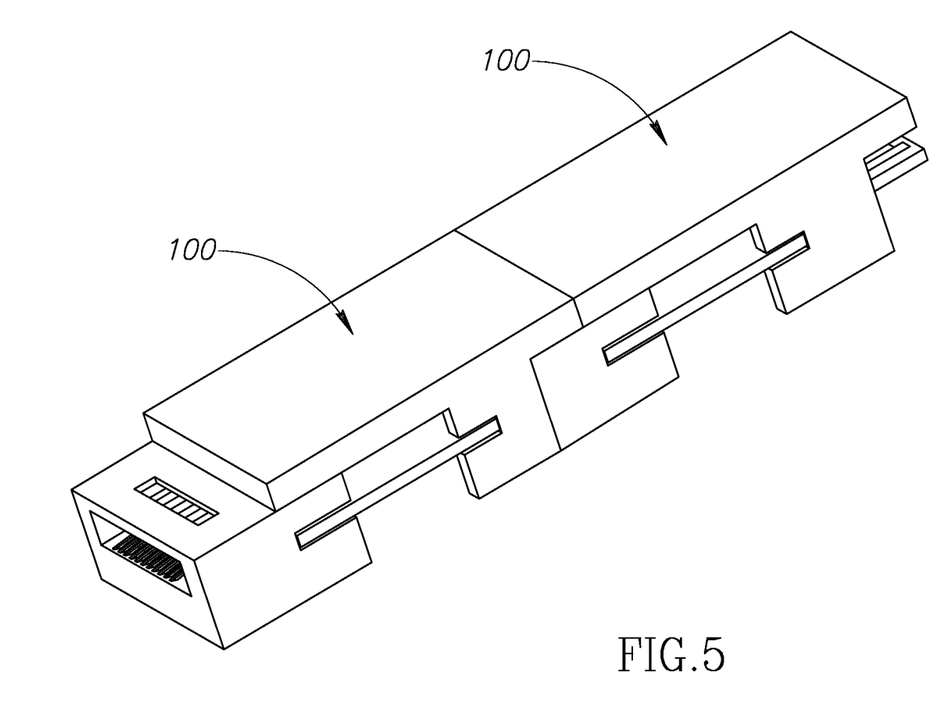
FIG. 5 schematically shows a daisy chain of cage EXTENDERs plugged into a cage, in accordance with an embodiment of the invention.

In an embodiment of the invention EXTENDERs 100 are configured so that they may be daisy chained, that is plugged one into the other, so that functionalities provided by a plurality of EXTENDERs may be provided to SFP module. FIG. 5 schematically shows a plurality of optionally two EXTENDERs 100 daisy chained in accordance with an embodiment of the invention. Optionally, since daisy chained EXTENDERs have a length larger than that of a single EXTENDER, SFP cages that are anticipated to be used with an EXTENDER daisy chain may be configured having lengths larger than that of a conventional SFP cage.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. Apparatus configured to provide a functionality to a small form-factor pluggable (SFP) module having a SFP connector that may be plugged into a cage socket of an SFP cage, the apparatus comprising:
    a connector having substantially the same interface as the SFP connector of the SFP module and configured to be inserted into the cage socket into which the SFP connector may be plugged;
    functionality circuitry that is electrically connected to the connector and provides the functionality; and
    a socket electrically connected to the functionality circuitry, having substantially the same interface as the cage socket to receive the SFP connector of the SFP module and to electrically connect the SFP module to the functionality circuitry.

2. Apparatus according to claim 1 wherein the functionality circuitry comprises electric circuitry, and/or a Field Programmable Gate Array (FPGA), and/or an Application Specific Integrated Circuit, and/or a Central processing Unit (CPU).

3. Apparatus according to claim 1 wherein the functionality circuitry is configured to generate dying-gasp messages.

4. Apparatus according to claim 1 wherein the functionality circuitry comprises a mini-fan to cool the SFP.

5. Apparatus according to claim 1 wherein the functionality comprises functionality of an Ethernet Network Interface Device (NID) or Ethernet Network Termination Unit (NTU).

6. Apparatus according to claim 1 wherein the functionality circuitry is configured to provide packet inspection, statistics collection, packet header editing, packet insertion and removal, and/or traffic conditioning.

7. Apparatus according to claim 6 wherein packet inspection detects anomalous or potentially malicious packets, or classifies packets and collects statistics regarding applications in use, or monitors and optionally controls traffic flows.

8. Apparatus according to claim 6 wherein packet header editing is employed for packet marking, manipulation of Ethernet VLAN tags, manipulation of MPLS label stacks, or protocol conversion.

9. Apparatus according to claim 6 wherein packet insertion and deletion performs Fault Management or Operations Administration and Maintenance (OAM).

10. Apparatus according to claim 9 wherein the functionality circuitry is configured to pass most packets transparently from a conventional SFP to a cage socket, but distinguish OAM or performance measurement packets.

11. Apparatus according to claim 10 wherein the functionality circuitry is configured to act as a reflector or responder.

12. Apparatus according to claim 6 wherein traffic conditioning shapes traffic to comply with Ethernet bandwidth profiles defined in Metro Ethernet Forum Technical Specification MEF-10.2.

13. Apparatus according to claim 1 wherein the functionality circuitry is comprised in a PCB.

14. Apparatus according to claim 13 wherein the PCB comprises the connector configured to be inserted into the cage socket.

15. Apparatus according to claim 14 wherein the PCB comprises a connector plugged into the socket that electrically connects the functionality circuitry to the socket.

16. Apparatus according to claim 15 and comprising a cowling that houses a region of the PCB comprising the connector configured to be inserted into the cage socket.

17. Apparatus according to claim 16 wherein the cowling is formed having slots into which the PCB seats.

18. Apparatus according to claim 17 wherein the PCB is held in place between and by the socket and the cowling.

19. Apparatus according to claim 1 configured to be connected mechanically and electrically to another apparatus according to claim 1 by plugging the connector of the apparatus into the socket of the other apparatus.

\* \* \* \* \*